United States Patent [19]
Grundy
[11] 3,889,201
[45] June 10, 1975

[54] FAIL-SAFE CIRCUIT ARRANGEMENT

[75] Inventor: Reed H. Grundy, Murrysville, Pa.
[73] Assignee: Westinghouse Air Brake Company, Swissvale, Pa.

[22] Filed: Aug. 15, 1973
[21] Appl. No.: 388,378

[52] U.S. Cl. .................... 330/21; 330/29; 330/31; 330/32; 330/51; 330/94; 330/165
[51] Int. Cl. ........................................ H03f 3/04
[58] Field of Search ........... 330/21, 29, 31, 32, 87, 330/94, 165, 169, 57

[56] References Cited
UNITED STATES PATENTS 2,581,159 1/1952 Achenbach .................... 330/169 X
3,162,821 12/1964 Mohler et al. .................... 330/32 X

*Primary Examiner*—James B. Mullins
*Attorney, Agent, or Firm*—J. B. Sotak; R. W. McIntire, Jr.

[57] ABSTRACT

A vital electronic circuit arrangement which includes a low-pass filter network for passing a.c. signals. A transistor amplifier for amplifying the a.c. signals and for supplying the amplified a.c. signals to a step-up transformer. The transformer includes a controllable tap primary winding for discretely varying the turns-ratio of the transformer in accordance with the frequency of the a.c. signals.

10 Claims, 2 Drawing Figures

FAIL-SAFE CIRCUIT ARRANGEMENT

This invention relates to a vital type of a variable voltage solid-state electronic circuit and more particularly to a fail-safe circuit arrangement employing a resistance-capacitance filter network for coupling a.c. signals to the input of a semiconductive amplifier circuit that has its output coupled through a control transformer which has a variable tap primary winding for selecting the turns-ratio and for establishing the voltage transfer characteristics of the transformer.

BACKGROUND OF THE INVENTION

In numerous types of signal and communication systems for use in railroad and mass and/or rapid transit operations, it is common practice to employ cab signals to control the speed of a vehicle or train as it moves along its route of travel. Generally, the cab signals, that are conveyed to the vehicle or train, are in the form of coded carrier wave forms. That is, a carrier wave signal is selectively coded at one of a plurality of code rates. Each code rate signifies a given maximum speed at which a vehicle or train is permitted or authorized to travel along a particular section of trackway. In practice, the coded carrier signals are normally fed to the track rails and are picked up by inductive coils which are mounted on the front end of the vehicle or train. The induced signals are amplified, demodulated, shaped and filtered, and then the recovered signals are applied to the decoder or decoding unit which controls the state or condition of a plurality of decoding relays. One essential and necessary function in a cab signaling operation is for the car-borne equipment to sense for overspeed conditions. When the actual speed of a moving vehicle or train exceeded the authorized speed permitted in a given track section or restricted area, an overspeed signal is produced onboard a violating vehicle. Normally, this speed check is accomplished by the overspeed control package. A tachometer in the form of a frequency generator produces signals which are proportional to the actual speed of the moving vehicle. Previously, the decoding relays completed a circuit path from the frequency generator through a selected one of a plurality of individual electrical filters in accordance with the last received speed command signal. It will be understood that the number of electrical filters was dependent upon the number of discrete speeds employed in the particular cab signaling system. Each filter was generally made up of four sections with an isolation stage located between each section. These previous frequency filtering circuits were very costly to construct due to the excessive number of electrical components which were required to be used and assembled. The design of these previous filters presented further difficulties in that multiple adjustments were required in maintaining accuracy of the circuit components. In addition to the costliness these prior filtering circuits were relatively large and bulky requiring more storage space. Thus, the optimum type of frequency filtering circuits for cab signaling equipment should be as simple as possible in order to minimize purchase and maintenance costs and to maximize space, weight and reliability considerations.

OBJECTS OF THE INVENTION

Accordingly, it is an object of this invention to provide a unique fail-safe variable voltage circuit arrangement for use in cab signaling equipment for railroad and mass and/or rapid transit operations.

A further object of this invention is to provide a vital electronic circuit having an R-C network supplying a.c. signals to the input of amplifying circuit which has its output connected to a variable transfer ratio control device.

Another object of my invention is to provide a novel active selectable turns-ratio circuit employing a half section resistance-capacitance network feeding a semiconductive amplifying circuit supplying an adjustable control device.

Still a further object of this invention is to provide a vital type of an electronic low frequency pass signal passing circuit having a passive R-C network and active amplifying circuit which feeds a variable tap primary winding of a transformer.

Still another object of this invention is to provide a unique controllable transistor voltage amplifying-filtering circuit which operates in a fail-safe manner.

Yet a further object of this invention is to provide a new and improved selectable low-pass circuit employing a half section passive R-C network and a solid-state active amplifier for feeding a multi-tapped output transformer.

Yet another object of this invention is to provide a vital type of an active circuit arrangement employing a resistance-capacitance network for supplying a.c. signals to a transistor amplifying circuit that feeds a voltage transformer which has a variable turns-ratio characteristic.

An additional object of this invention is to provide a fail-safe amplifying-filtering circuit arrangement which is economical in cost, simple in design, reliable in operation, durable in use and efficient in service.

SUMMARY OF THE INVENTION

In accordance with the present invention, the vital or fail-safe low frequency pass electronic circuit includes a passive R-C network and an active multi-stage amplifying circuit. The passive R-C network includes a simple single L or half section made up of a carbon composition series resistor in combination with a four-terminal shunt capacitor. The amplifying circuit includes an input stage having a first NPN transistor Q1 connected in a common collector configuration. The base electrode of the first transistor is coupled to the four-terminal capacitor via a coupling resistor. The collector electrode of the first transistor is directly connected to the positive terminal of the d.c. supply potential. The emitter electrode of the first transistor is connected to the input of a second or output stage of the amplifying circuit. The output amplifying stage includes a second NPN transistor also connected in a common collector configuration. The input base electrode of the second transistor is coupled to the output of the first stage via an input resistor. The base electrode of the second transistor is also connected to a d.c. biasing resistor. The emitter electrode is coupled to the primary winding of a transformer via a swamping resistor. The swamping resistor is by-passed by a by-pass capacitor. The primary winding is a multi-turn coil having a plurality of tap points. Each of the tap points is connected to the anode of a separate one of a plurality of diodes. The cathode of each diode is selectively connected to the negative supply voltage terminal via an electrical contact. The negative supply voltage forwardly biases the selected diode which, in turn, establishes the turns-ratio between the primary and second windings of the transformer. Thus, by closing a selected one of the electrical contacts the voltage developed across the secondary winding can be increased and decreased in accordance with the turns-ratio.

BRIEF DESCRIPTION OF THE DRAWINGS

The foregoing objects and other additional features and advantages of my invention will become more fully evident from the foregoing detailed description when considered in conjunction with the accompanying drawings wherein.

DESCRIPTION OF THE PREFERRED EMBODIMENT

Figure 1:
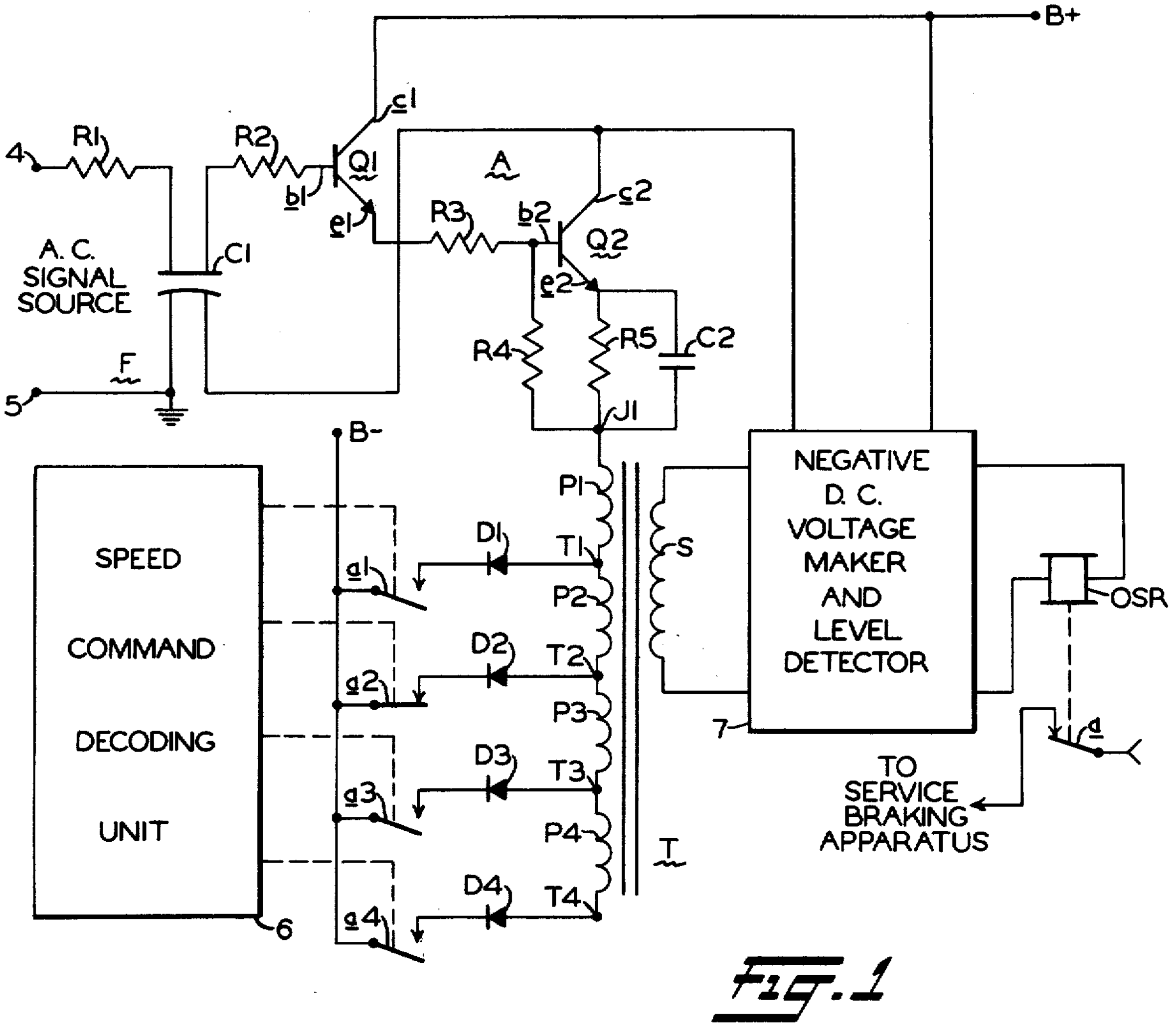
FIG. 1 is a schematic circuit diagram illustrating a preferred embodiment of the fail-safe selectable low-pass filtering circuit arrangement of the present invention.

Referring now to the drawings, and in particular to FIG. 1, there is shown a portion of the overspeed control apparatus for a cab signaling system employing the vital or fail-safe variable electronic circuit arrangement of the present invention. The electronic circuit of FIG. 1 includes a simple filter circuit in the form of a single L section or half section resistance-capacitance (R-C) filter network and a semiconductive or solid-state amplifying circuit feeding a multi-tapped transformer. That is, in actual practice the vital electronic circuit is basically made up of the passive resistance-capacitance (R-C) network F, the active transistorized amplifier circuit A and the step-up transformer T.

As shown, a resistor R1 forms the resistive arm of the low-pass R-C network 1 while a four-terminal capacitor C1 forms the reactive arm of the low-pass R-C network F. As shown in the present instance, one end of the resistor R1 is directly connected to upper terminal 4 of a pair of a.c. input terminals while the other end of the resistor is connected to the upper plate of the four-terminal capacitor C1. The lower plate of capacitor C1 is directly connected to the other a.c. input terminal 5 which is ground. Thus, a low-pass filter circuit is connected from input terminal 4 through resistor R1, through a pair of terminals of the four-terminal capacitor C1 to the input terminal 5. The a.c. input signals applied terminals 4 and 5 are supplied by a suitable carborne source or speed sensing device, such as, an axle driven generator, so that the signal frequency is directly proportional to the actual speed of the moving vehicle. As shown, the other pair of terminals of the four-terminal capacitor C1 is coupled to the first or input stage of the semiconductive or solid-state amplifier circuit A. The active amplifier A includes a first NPN transistor Q1 connected in a common collector configuration. The emitter-follower transistor Q1 includes an emitter electrode *e*1, a collector electrode *c*1, and a base electrode *b*1. The base electrode *b*1 is coupled to the upper plate of the four-terminal capacitor C1 via coupling resistor R2. The associated lower plate of capacitor C1 connects to the reference point, namely, ground, for the negative d.c. voltage maker and level detector 7 so that a constant check is made on the integrity of the two lower leads of capacitor C1. The collector electrode *c*1 is directly connected to the positive voltage terminal B+ of a suitable source of d.c. biasing and operating potential (not shown). The output signal is derived from the emitter electrode *e*1 and is applied to the input of a second or output stage of the amplifier circuit A. The output stage includes a second NPN transistor Q2 connected in a common collector configuration. The emitter-follower transistor Q2 includes an emitter electrode *e*2, a collector electrode *c*2 and a base electrode *b*2. As mentioned above, the emitter electrode *e*1 is connected to the input or base electrode *b*2 via a resistor R3. As shown, the collector electrode *c*2 of transistor Q2 is directly connected to the reference potential point, namely ground. The base electrode *b*2 of transistor Q2 is also connected by a biasing resistor R4 to the a.c. output point J1 of the second stage. The emitter electrode *e*2 of transistor Q2 is connected to the a.c. output point J1 via a swamping resistor R5 which is shunted by by-pass capacitor C2 to prevent degenerative feedback. It will be noted that the output stage is biased in such a manner that the potential or the magnitude of the negative voltage applied to the diodes D1, D2, D3 and D4 is not critical. The capacitor C2 is used to by-pass resistor R5 and thus couple the a.c. portion of the signal directly to the transformer primary connection J1.

The emitter electrode *e*2 of transistor Q2 and, in turn, the a.c. output point J1 is connected to the primary winding of the step-up transformer T. The primary is made up of a plurality of windings P1, P2, P3 and P4 which are divided by taps T1, T2, T3, and T4, respectively. Each tap point T1, T2, T3 and T4 of the primary winding is connected to the anode of diodes D1, D2, D3 and D4, respectively. Each cathode of diodes D1, D2, D3 and D4 is associated with a given one of a plurality of front relay contacts *a*1, *a*2, *a*3 and *a*4, respectively. Thus each of the primary windings P1, P2, P3 and P4 is under control of one of the associated front contacts *a*1, *a*2, *a*3 and *a*4, respectively. In the present instance, contact *a*1 is associated with diode D1, tap T1 and winding P1, *a*2 is associated with diode D2, tap T2, and winding P2, *a* 3 is associated with diode D3, tap T3, and winding P3, and *a*4 is associated with diode D4, tap T4, and winding P4. As shown, the heels of the front contacts are connected in common and are connected to the negative voltage terminal B− of the d.c. supply source. Thus, a load circuit is established from the B− supply terminal via one of the front contacts, one of the diodes, one of the taps and primary winding portions, thru capacitor C2, to emitter *e*2 and collector *c*2 to ground. In actual practice, the number of turns of each portion of the primary winding have been chosen to be equal so that the total number of effective primary turns is a numerical multiple of the number of portions employed. That is, the turns on portion P1 are one half the number of turns on portions P1 and P2, the turns on portion P1 are one third the number of turns on portions P1, P2 and P3, and the turns on portion P1 are one fourth the number of turns on portions P1, P2, P3 and P4. Further, it has been found advantageous to select the turns of the primary portions to be a linear function of the speed. As shown, the positions of movable front contacts *a*1, *a*2, *a*3 and *a*4 are controlled by a vehicle-carried speed command decoding units 6. As previously mentioned, coded cab signals are picked up from the track rails by inductive pickup means and are demodulated, amplified, shaped, limited, and decoded by the cab signal equipment. The speed command decoding unit 6 of the cab signal equipment includes a plurality of electromagnetic decoding relays which are energized or deenergized in accordance with the code rate or frequency of the various received coded cab signals. Thus, front contacts *a*1, *a*2, *a*3 and *a*4 are either opened or closed in accordance with the electrical condition of its associated electromagnetic relay. That is, the energized and deenergized decoding relays of the decoding unit 6 function to effectively establish a load circuit path with only portion P1 or successive combinations of portion P1 with portion P2 or portions P2 and P3 or portions P2, P3 and P4. Alternatively, the speed command decoding unit 6 of the cab signal equipment may include a plurality of solid-state decoding apparatus which energize the appropriate diodes D1, D2, D3 and D4 in accordance with the code rate of frequency of the various received coded cab signals. Thus, the diodes D1, D2, D3 and D4 are either conductive or nonconductive in accordance with the electrical condition of its associated code filter. By forcing diodes D1, D2, D3 or D4 into conduction, a low impedance path for the a.c. signal is created and thus utilizing the appropriate number of primary turns between the conducting diode and point J1. It will be understood that a greater or lesser number of primary winding portions may be employed dependent upon number of speed commands used in any given cab signaling system. It will be appreciated that the amount of voltage induced in the secondary winding S of transformer T is a function of the turns-ratio times the value of voltage developed in the primary winding. In present instance, with contact *a*2 closed and contacts *a*1, *a*3 and *a*4 opened, the secondary voltage $V_s$ is equal to $V_p$NS/N (P1 + P2) or $V_p$NS/2 (NP1). Thus, the amount of voltage induced into the secondary winding S is varied by the speed command decoding unit 6 in accordance with which one of the selected relay contacts is closed. Hence, with contact *a*1 closed the secondary voltage VS is equal to $V_p$NS/NP1, with contact *a*3 closed the secondary voltage VS is equal to VPNS/N (P1+P2+P3) or VPNS/3(NP1) and with contact *a*4 closed the secondary voltage VS is equal to VPNS/N (P1+P2+ P3+P4) or VPNS/4 (NP1)

where VP is primary winding voltage at the particular instance,

NS is the number of turns of the secondary winding, and (NP1) is the number of turns of the primary winding between points J1 and T1.

It will be understood that only one of the decoding relays of unit 6 is energized at any given time so that only one of the front contacts is closed at any given time. As shown, the a.c. signals induced into the secondary winding S are applied to the input of a vital type of a d.c. voltage maker and level detector 7.

The fail-safe d.c. voltage maker may be of the type shown and disclosed in Letters Patent of the U.S. No. 3,527,986, namely, amplifier 9 and rectifier 21, as illustrated in FIG. 2*a*, and the level detector may be similar to the type shown and disclosed in copending application for Letters Patent of the United States, Ser. No. 1,970, filed Jan. 12, 1970, for Fail-Safe circuit Arrangement, by John O. G. Darrow, which is assigned to the assignee of the present application. Briefly, the d.c. voltage maker is a fail-safe amplifier-rectifier circuit in which no critical circuit or component failure is capable of increasing the gain characteristics of the circuit. Briefly, in practice, the amplifier includes two transistor amplifying stages. The amplified output from the amplifier is applied to a fail-safe voltage rectifier and voltage doubling circuit which converts the a.c. signals into d.c. voltage. The output of the amplifier-rectifier is then applied to the input of the fail-safe level detector. The fail-safe level detector includes a feedback type of oscillator circuit and a voltage breakdown device. The oscillator employs a transistor amplifier and a frequency determining circuit which is interconnected with the voltage breakdown device for controlling the amount of regeneration and, in turn, the oscillating condition of the oscillator. In operation, the voltage breakdown device normally exhibits the high dynamic impedance and only assumes a low dynamic impedance when a sufficient d.c. voltage causes the device to break down and conduct current. Thus, the oscillating circuit will only produce a.c. oscillations when the d.c. voltage exceeds a predetermined amplitude, thereby causing the voltage breakdown device to exhibit a low impedance so that sufficient regenerative feedback is provided for sustaining oscillation. As shown, the a.c. oscillating signals are applied to the coil of the overspeed control relay OSR. It will be seen that the overspeed control relay OSR includes at least one contact, namely, front contact *a* which controls the circuit condition of the service brakes of the vehicle or train. As shown, the front contact *a* is closed due to the energization of the overspeed control relay OSR. Thus, the circuit to the brake control is completed and the brakes are released. As will be described in detail hereinafter, the back contact *a* is released by the deenergization of the overspeed control relay OSR which results in the interruption of the service brake control circuit. Thus, the brakes will be applied when the overspeed relay OSR is deenergized so that the speeding vehicle is brought under control and will begin to decelerate.

MODE OF OPERATION OF THE INVENTION

Turning now to the operation of the present invention, it will be assumed that all the components and elements are intact and that the filtering circuit and the entire cab signaling system is operating properly. Further, let us assume that the present code rate being received onboard the vehicle is effective in energizing the appropriate code following relay of decoding unit 6 for picking up the front contact *a*2. As previously mentioned, it will be understood that only one of the decoding relays may be energized at any given time so that under the assumed condition front contact *a*2 is closed while the front contacts *a*1, *a*3 and *a*4 are opened. Thus, under this assumed condition the primary winding portions P1 and P2 form the load which is connected to point J1 and effectively the emitter *e*2 of transistor Q2. Hence, the voltage induced into the secondary S of transformer T is effectively VPNS/NP(P1+P2) or VPNS/2(NP1). As mentioned above, the speed of the vehicle is constantly being sensed so that the resistor R1 and the capacitor C1 are being supplied with a.c. input signals which are produced by the axle driven frequency signal generator. Normally, the axle signals are squared and limited in amplitude and are then connected to input terminals 4 and 5. As noted above, the resistor R1 and the capacitor C1 form a low-pass filter circuit having the voltage-frequency characteristics shown by curve k of FIG. 2. It will be observed that the frequency response of the filter is initially flat or level so that substantially all of the low frequency signals produced by the tachometer or frequency generator are passed by resistor R1 and capacitor C1. Accordingly, the input signals appearing on terminals 4 and 5 are amplified by the transistor two emitter-follower stages of the amplifier A. The amount of amplification is the product of the gains of the two stages. The a.c. current flowing through the primary winding produces an expanding and collapsing magnetic field which is mutually coupled to the secondary winding S. Thus, a.c. current flows through and an a.c. voltage is developed across the secondary winding S. It will be appreciated that the amplitude of the a.c. voltage signals induced into the secondary winding S is dependent upon the coefficient of the coupling (which in this case is kept constant) between the primary and secondary windings as well as their turns-ratio. As shown, the a.c. voltage signals appearing across secondary winding S are applied to the negative d.c. voltage maker and level detector 7. After amplification, rectification and detection the output from the circuit 7 is employed to energize a conventional overspeed relay OSR. The overspeed relay OSR is normally energized so that its front contact *a* remains closed so long as relay is picked up. Hence, the circuit to the service brake control apparatus is completed so that the application of the brakes is precluded.

Figure 2:
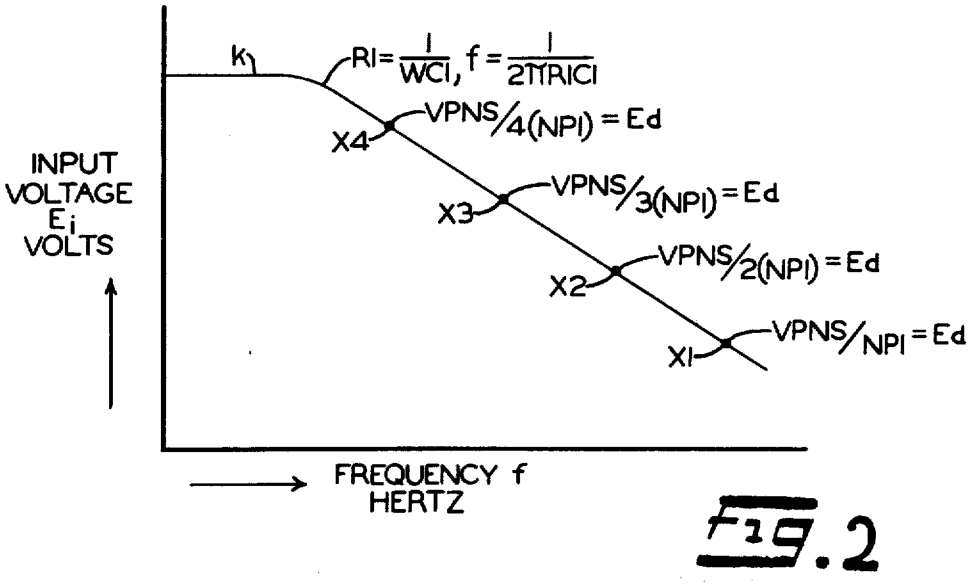
FIG. 2 is a graphic illustration of the voltage versus freguency characteristic curve of the circuit of FIG. 1.

When the signal or frequency of the tachometer reaches a given value, namely, the half power point which is when $R=1/\omega C1$, roll-off is produced by the attenuating characteristics of the low-pass filter network formed in the resistor R1 and capacitor C1. The decrease in the input signal is reflected across the secondary winding S so that output voltage Ed will also decline as shown in FIG. 2. That is, the filter exhibits a transmission bandwidth from approximately zero (0) frequency to a specified upper frequency, namely $1/2\Pi R1C1$, as illustrated in the drawing. At this point, roll-off is exhibited by the filter so that an attenuating effect occurs for all higher frequencies. It will be noted that the slope of the curve is representative of the rate of attenuation which, in this case, is 6dbs per octave, or 20 dbs per decade. It will be noted that the amplitude of the output voltage ES continues to decrease as the frequency increases. At a given point, namely, point X2, the amplitude of the output voltage Ed intersects the voltage level VPNS/2(NP1) which is proportional to the Zener or breakdown voltage of the level detector circuit 7. Thus, at approximately point X2 the output voltage will become less than the detection voltage level so the Zener diode is rendered nonconductive. Hence, no signal voltage will appear at the output of level detector 7 and thus the overspeed relay becomes deenergized so that its front contact is opened. Thus, the circuit to the brake control apparatus is interrupted and the brakes of the vehicle are applied. The relay will remain deenergized and its front contact will remain opened so long as the frequency of the signal produced by the tachometer is above the frequency of the point X2. Hence, an overspeed condition is readily recognized by the presently described circuit so that the vehicle is under positive control at all times.

It will be appreciated that when the speed decoding unit 6 receives one of the other speed command signals, the front contact *a*2 will be opened and one of the other front contacts *a*1, *a*3, or *a*4 will become closed so that points X1, X3 or X4 will be the controlling levels on curve *k*. It will be seen that point X4 occurs at a lower frequency than point X3 and that points X2 and X1 occur at a higher frequency than point X3. It will be noted that the value of the output voltage Ed at point X3 is VPNS/3(NP1) while the output voltage level at X4 is VPNS/4(NP1). Similar, the output voltage ES at any other point, such as, point X*n* is appropriately VPVS/*n*(NP1). In analyzing, curve *k*, it will be observed that the higher the frequency, the lower the value of voltage E*d*. Thus, there is a need for increasing the turns-ratio in order to maintain the relay OSR picked up.

Thus, it can be seen that a single section low-pass filter network and an active amplifying circuit employing a selectable tapped primary winding to vary the level of the output voltage of the presently described fail-safe electronic circuit.

As previously mentioned, while four distinct speed commands have been described, it will be appreciated that a greater or lesser number of speed commands may be readily accommodated by the presently described invention. In addition, it will be appreciated that the number of turns of the various portions of the primary winding may be other than fixed multiples of each other depending upon the particular application and use of the presently described circuit.

Additionally, it will be noted that the circuit operates in a fail-safe fashion in that no critical component or circuit failure is capable of increasing the turns-ratio which is the ratio of the number of turns of the higher voltage to that of the low voltage winding. In practice, the necessary ruggedness is achieved by a potting to hold the turns positively separated. Further, it will be appreciated that it is necessary to employ certain other precautionary measures in regard to the circuit design as well as the selection of components. For example, the critical resistors of the circuit are preferably constructed of a carbon composition so that they are incapable of becoming short circuited. The circuit is meticulously designed and laid out to ensure that leads in proximity of each other are incapable of touching each other to create a short circuit. The use of the four-terminal capacitor C1 ensures that the loss of a lead will not cause an unsafe condition. In addition, it will be noted that failure of the other passive elements as well as any active transistor results in elimination of the necessary biasing and operating potentials or destroys the amplifying characteristics of the transistor so that an unsafe condition, namely, a higher than normal level of voltage is not capable of being applied to the d.c. voltage maker and level detector circuit 7.

It will be appreciated that while the present invention finds particular utility in cab signaling equipment and, in particular to a speed command control arrangement, it is understood that the invention may be employed in other equipment and apparatus which have need for such operation.

In addition, it will be readily evident that this invention may be employed in other various systems and apparatus, such as, security circuits and equipment which require the vitality and safety inherently present in this invention.

Additionally, it will be understood that other changes, modifications and alterations may be employed without departing from the spirit and scope of this invention. For example, the NPN transistors may be replaced by PNP transistors simply by changing the polarity of the d.c. supply voltage. In addition, it will be appreciated that other types of decoding units and d.c. makers and level detectors may be employed in practicing the present invention. As mentioned, in one instance, the cathode of the diodes D1, D2, D3 and D4 may be directly connected to the separate filters of a multiple type of speed decoding unit rather than to the individual relay contacts as shown. Thus, it is understood that the showing and description of the present invention should be taken in an illustrative or diagrammatic sense only.

Having now described the invention, what I claim is new and desire to secure by Letters Patent is:

1. A fail-safe circuit arrangement comprising, a source of a.c. signals, a low-pass filter connected to said a.c. signal source, an amplifier, said amplifier having an input and an output, said input of said amplifier connected to said low-pass filter, a turns-ratio device, said output of said amplifier connected to said turns-ratio device, a load, a turns-ratio control device, said turns-ratio device connected to said load, and said turns-ratio control device selectively varying the turns-ratio of said turns-ratio device.

2. A fail-safe circuit arrangement as defined in claim 1, wherein said turns ratio device includes an inductive means connected between said output of said amplifier and said load.

3. A fail-safe circuit arrangement as defined in claim 2, wherein said inductive means is a transformer having a primary winding connected to said output of said amplifier and a secondary winding connected to said load.

4. A fail-safe circuit arrangement as defined in claim 3, wherein said primary winding including a plurality of tap points for varying the turns-ratio of said transformer.

5. A fail-safe circuit arrangement as defined in claim 4, wherein each of said tap points is connected to a separate switching means for selectively varying the number of effective turns on said primary winding.

6. A fail-safe circuit arrangement as defined in claim 5, wherein each of said switching means includes a diode and an electrical contact.

7. A fail-safe circuit arrangement as defined in claim 1, wherein said low-pass filter includes a resistive and a capacitive element.

8. A fail-safe circuit arrangement as defined in claim 1, wherein said low-pass filter includes a half section R-C network.

9. A fail-safe circuit arrangement as defined in claim 1, wherein said amplifier includes a first amplification stage and a second amplification stage.

10. A fail-safe circuit arrangement as defined in claim 1, wherein said amplifier includes a common collector input stage and a common collector output stage.

* * * * *